June 23, 1942.  L. A. MEKLER  2,287,047
CONTROL OF ENDOTHERMIC AND EXOTHERMIC REACTION
Filed Sept. 25, 1939
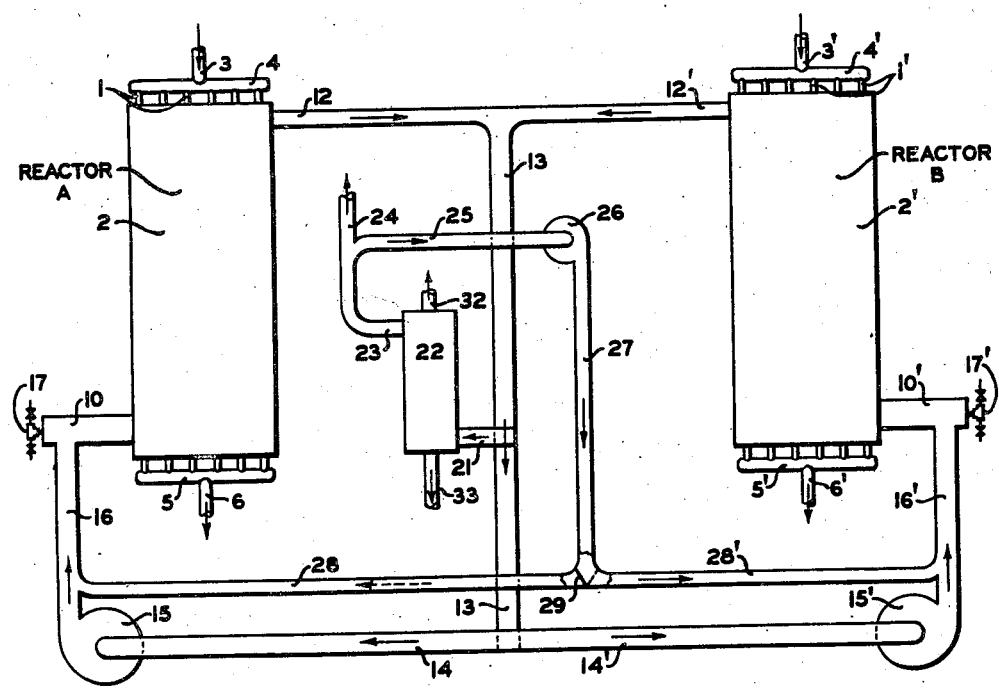
INVENTOR
LEV A. MEKLER
BY Lee J Barr
ATTORNEY Patented June 23, 1942

2,287,047

UNITED STATES PATENT OFFICE 2,287,047

CONTROL OF ENDOTHERMIC AND EXOTHERMIC REACTIONS

Lev A. Mekler, Chicago, Ill., assignor to Universal Oil Products Company, Chicago, Ill., a corporation of Delaware Application September 25, 1939, Serial No. 296,454

5 Claims. (Cl. 252—242)

This invention relates to an improved method and means of controlling temperatures in simultaneously conducted endothermic and exothermic reactions and particularly in conversion processes of the class employing a plurality of reactors, each of which is alternately employed as a zone of endothermic reaction and a zone of exothermic reaction.

Processes of this general character ordinarily employ, in each reactor, one or a plurality of beds of contact material, such as a catalyst capable while in active state of promoting the desired conversion reaction, the reactants being passed through said beds and provision being made for supplying heat to the reaction zone wherein the endothermic reaction is taking place and abstracting heat from the zone wherein the exothermic reaction is taking place by passing a convective medium at suitable temperature in indirect heat transfer relation with each bed of said contact material and the reactants and conversion products flowing therethrough.

In order to obtain good thermal economy in such a system it is advantageous to transfer heat evolved in an exothermic reaction to the endothermic reaction. In conventional practice this is accomplished by establishing a continuous cyclic flow of the convective medium through the exothermic side of the system to the endothermic side of the system and back to the exothermic side, with provision for increasing or decreasing the temperature of the convective medium, as required, during its passage from one side of the system to the other. With this conventional practice, when the zones of endothermic and exothermic reaction are alternated with respect to the reactors, the direction of flow of the convective medium through at least a portion of the cycle is reversed, in order that the convective medium will serve as a cooling medium in that side of the system to which the exothermic reaction has been transferred and as a heating medium in that side of the system to which the endothermic reaction has been transferred.

The present invention follows conventional practice in the use of a convective medium for controlling temperatures in the endothermic and exothermic phases of the system, but departs from the conventional practice above outlined by employing two circuits instead of a single circuit, the two circuits having a common zone of juncture in which the convective medium of one circuit commingles with that of the other and their respective temperatures are averaged before the circuits are again separated. In the circuit serving the exothermic side of the system, the convective medium from the zone common to both circuits is cooled, when required, and in the circuit serving the endothermic side of the system, the convective medium from the common zone is heated, when required, heating and cooling being reversed with respect to the two circuits when the zones of endothermic and exothermic reaction are alternated with respect to the reactors.

The general method of temperature control provided by the invention, as above outlined, is applicable to the use of any desired type of convective medium regardless of whether it is liquid, vaporous or gaseous throughout the circuits and it may also be employed to advantage with a convective medium which is vaporized in the exothermic side of the system and condensed in the endothermic side. It is not limited to processes involving any specific class or type of endothermic and exothermic reactions, so long as they are simultaneously conducted, nor is it limited to operations in which the zones of endothermic and exothermic reaction are periodically shifted from one reactor to another. However, to more clearly explain the novel and advantageous features of the invention, the subsequent description is directed to that embodiment of the invention in which combustion gases are utilized as the convective medium and in which the zones of endothermic and exothermic reaction are periodically alternated.

Referring to the drawing, which is essentially a flow diagram of one embodiment of the system provided by the invention, two substantially identical reactors A and B are provided, each of which comprises one or more elements such as tubes I and I' extending through suitable jackets which are indicated as 2 and 2', these jackets being preferably insulated, although insulation is not indicated in the drawing. Suitable contact material, such as a catalyst capable while in active state of promoting the endothermic reaction, is disposed within the tubular elements I and I'.

When reactor A is employed as the zone of endothermic reaction the stream of reactants to be converted is supplied to the tubular elements I through line 3 and header 4, passes through the mass of contact material disposed within the tubular element and is converted. The resulting conversion products are discharged from the tubular elements through header 5 and line 6 to suitable recovery equipment not pertinent to the invention and therefore not illustrated.

In the particular type of conversion process now being considered, the exothermic reaction involves periodic reactivation of the catalyst or contact material. Reactivation is necessitated by the accumulation of deleterious combustible material, such as carbon or heavy carbonaceous material, which is deposited in the contact mass during the endothermic reaction when the latter involves the conversion of hydrocarbons such as, for example, in catalytic cracking or dehydrogenation.

When reactivation of the catalyst or contact material becomes necessary in the reactor which has been employed to conduct the endothermic reaction, the flow of the stream of reactants to this reactor is discontinued and diverted to the other reactor which contains fresh or freshly reactivated catalyst. For example, when the catalyst in reactor A requires reactivation the stream of reactants to be converted is supplied to the tubes of reactor B through line 3' and header 4' and the resulting conversion products are discharged from this zone through header 5' and line 6' to the same recovery equipment, not illustrated, to which the products from reactor A were previously supplied. This is accomplished in any well known manner by means of a suitable stream directing mechanism or switching valves which do not constitute a novel part of the present invention and are, for the sake of simplicity, omitted from the drawing.

During reactivation in reactor A a stream of reactivating gases, such as, for example, combustion gases containing a regulated amount of free oxygen or a mixture of steam and air, is supplied through line 3 and header 4 to tubes 1 and in passing therethrough contact the catalyst and burn the deposited deleterious material therefrom. The resulting spent or partially spent reactivated gases and combustion products are discharged from reactor A through line 5, containing valve 6, and may be discharged from the system or recirculated in any well known manner, not illustrated, after proper purification, temperature adjustment and replenishment of its oxygen content. Reactivation is accomplished in reactor B when required, in the same manner by introducing the reactivating gas stream to tubes 1" through line 3' and header 4' and discharging the resulting reactivation gases and combustion products therefrom through header 5' and line 6'. Switching valves, or any other suitable stream directing mechanism not illustrated, is employed to accomplish diversion of the reactivating gas stream from one reactor to the other, and periodic diversion of the effluents from each reaction zone to their desired destination.

The system so far described with reference to the drawing is not a novel part of the invention except in combination with its other features and may be considerably varied or modified without departing from the scope of the invention. It is only intended to illustrate one type of system in which the features of controlling the temperatures of simultaneously conducted endothermic and exothermic reactions may be advantageously utilized.

Assuming for the moment that the endothermic reaction is taking place in reactor A and the exothermic reaction in reactor B, necessitating the supply of heat to the former and cooling the latter. Combustion gases supplied to combustion and mixing zone 10, as will be described later, are therein commingled with hotter combustion gases generated in this zone by supplying a combustible mixture of fuel and air thereto. The resulting mixture of combustion gases is passed at the required temperature from zone 10 to and through the jacket of reactor A which surrounds the tubular elements 1 and in passing through the reactor supplies heat through the walls of the tubular elements to the contact material disposed therein and to the stream of reactants and conversion products passing therethrough, whereby the reaction temperature is controlled and the combustion gases cooled.

Simultaneous with the heating, accomplished as above described in reactor A, cooling is accomplished in reactor B by passing relatively cool combustion gases at the required temperature from zone 10' to and through shell 2' of reactor B in indirect heat transfer relation with the contact material undergoing reactivation in this zone and the reactivating gas stream and resulting combustion products passing through tubes 1', evolved heat being supplied to the combustion gases and the temperature of the exothermic reaction thus controlled.

Cooled combustion gases from reactor A and heated combustion gases from reactor B are supplied through the respective ducts 12 and 12' to duct 13 wherein the two streams are commingled and their temperature substantially equalized. A portion of the resulting commingled gases is directed from duct 13 through duct 14 to a suitable circulating device, such as fan or blower 15, by means of which they are supplied through duct 16 to zone 10. Another portion of the commingled gases from duct 13 is directed through duct 14' to a similar circulating device 15' and thence through duct 16' to zone 10'.

It will be apparent from the above that two separate cycles of combustion gases are established, one serving to supply heat to the zone in which the endothermic reaction is taking place, and the other serving to abstract heat from the zone in which the exothermic reaction is taking place, and the two streams of circulating combustion gases being commingled in zone 13. These two streams are each circulated at a substantially constant rate through the reactors, and to independently adjust the temperature of the stream entering each reactor to the level required for effecting the desired control of the reaction taking place therein, the stream supplied to the endothermic reactor is controllably heated and the stream supplied to the exothermic reactor is controllably cooled. Heating is accomplished by supplying fresh increments of hot combustion gases to combustion and mixing zones 10 or 10', depending upon which reactor is employed for conducting the endothermic reaction. For this purpose, suitable burners 17 and 17', communicating with the respective combustion and mixing zones 10 and 10', are provided to supply combustible fuel and air to these zones.

When reactor B is employed as the zone of exothermic reaction, burners 17' communicating with zone 10' are not operated. Similarly, when reactor A is employed as the zone of exothermic reaction burners 17 communicating with zone 10 are not in operation.

To accomplish cooling of the circulating stream of combustion gases being utilized to control the temperature of the exothermic reaction, a portion of the commingled stream of combustion gases passing through duct 13 is directed therefrom through duct 21 to a suitable cooling device such as heat exchanger 22 and is therein cooled by indirect heat exchange with any desired cooling medium which is supplied to this zone through line 32 and discharged therefrom through line 33. The resulting cooled combustion gases are directed from heat exchanger 22 through duct 23 and a portion of this stream, regulated to compensate for the additional hot combustion gases added to the cycle serving to control the temperature of the endothermic reaction, is discharged from the system through duct 24 to a suitable stack, or the like, not illustrated. The remaining portion of the cooled combustion gases are withdrawn from duct 23 through duct 25 by a suitable fan or blower 26 wherefrom they are directed to duct 27 and through ducts 28' and 16' to zone 10', or through ducts 28 and 16 to zone 10. A suitable stream directing member, such as damper 29, is provided at the junction of ducts 27, 28, and 28', the position of this damper determining the direction flow of the cooled combustion gases from duct 27.

When reactor B is employed as the zone of exothermic reaction, member 29 is in the position indicated by the solid line and the cooled combustion gases are supplied through duct 28' to duct 16' to commingle therein with the stream of hotter combustion gases supplied thereto through duct 14' and fan or blower 15', whereby the temperature of the combustion gas stream supplied to reactor B is adjusted to the required level. When reactor A is employed as the zone of exothermic reaction, member 29 is shifted to the position shown by the dotted line and the cooled combustion gases from duct 27 pass through duct 28 into duct 16 and, in commingling in this zone with the hotter combustion gases supplied thereto from fan or blower 15, the temperature of the combustion gas stream supplied to reactor A is adjusted to the desired value.

When the zones of endothermic and exothermic reaction are shifted with respect to reactors A and B, all that is required to obtain the desired temperature control in the two reactors is to discontinue the supply of fuel and air to the combustion and mixing zone serving the reactor wherein the endothermic reaction has been or is about to be completed, supply fuel and air to the combustion and mixing zone serving the reactor wherein the exothermic reaction has been or is about to be started and shift the position of stream directing member 29, so that cooled combustion gases pass to the combustion and mixing zone in which firing has been discontinued and are prevented from passing to the combustion and mixing zone where firing has been started. The fans or blowers, 15, 15' and 26 may each be operated at a constant speed regardless of the switching of the endothermic and exothermic reactions from one reactor to the other and each of the fans or blowers also each operate at a constant temperature.

To exemplify the ease and simplicity of operation of the temperature control system illustrated in the drawing, under specific operating conditions such as encountered, for example, in the catalytic conversion of hydrocarbon oil (the endothermic reaction), with periodic regeneration of a catalyst in each reactor (the exothermic reaction): we will assume that catalytic cracking is taking place in reactor A and the catalyst in reactor B is being reactivated. The combustion gases utilized to heat reactor A enter this zone at a temperature of approximately 1550° F. and are supplied from reactor A through duct 12 to duct 13 at a temperature of approximately 1225° F. The combustion gases utilized to cool reactor B enter this zone at a temperature of approximately 950° F. and are directed from the reactor through duct 12' to duct 13 at a temperature of approximately 1075° F. Substantially equal quantities of combustion gases are utilized in the two cycles of the system and the temperature of the commingled combustion gases supplied from duct 13 through ducts 14 and 14' to the respective fans or blowers 15 and 15' is approximately 1150° F. Sufficient fuel and air is supplied to combustion and mixing zone 10 to increase the temperature of the combustion gases therein from approximately 1150° F. to approximately 1550° F. To maintain a substantially constant volume of combustion gases in the two cycles, a quantity of the cooled combustion gases regulated to compensate for the hot combustion gases added in combustion zone 10 are removed from the system through duct 24, the temperature of this stream being approximately 950° F. The quantity of combustion gases supplied through duct 13 to heat exchanger 32 is sufficiently in excess of the quantity of cooled combustion gases removed from the system through duct 24 to accomplish reduction of the temperature of the combustion gases from fan or blower 15' from approximately 1150° F. to approximately 950° F., and fan or blower 26 is operated at a substantially constant speed to deliver the combustion gases required for this degree of cooling from duct 27 to duct 16' at a temperature of approximately 450° F.

The above conditions are maintained in the system when the zone of endothermic reaction is shifted to reactor B and the zone of exothermic reaction is shifted to reactor A except that, by discontinuing firing in zone 10, switching the position of damper 29 and initiating firing in zone 10', the combustion gases enter reactor B at a temperature of approximately 1550° F. and are discharged from this zone at a temperature of approximately 1225° F., while the combustion gases enter reactor A at a temperature of approximately 950° F. and are discharged from this zone at a temperature of approximately 1075° F.

I claim as my invention:

1. In a process involving endothermic and exothermic reactions simultaneously conducted in separate reaction zones about each of which a convective medium is circulated to control the reaction temperatures therein, the improvement which comprises establishing a separate cycle of convective medium to serve each of said reactions, commingling the convective media of the separate cycles in a zone common thereto, whereby to substantially equalize the temperatures of said media, and thereafter further heating the convective medium in the cycle serving the endothermic reaction, prior to its passage about the endothermic reaction zone, and further cooling the convective medium in the cycle serving the exothermic reaction, prior to its passage about the exothermic reaction zone.

2. The process defined in claim 1 wherein combustion gases are employed as the convective medium in both cycles, said further heating of the convective medium serving to control the temperature of the endothermic reaction being accomplished by adding fresh increments of hotter combustion gases to the circulating stream of this convective medium subsequent to its passage through said common zone, a quantity of the commingled combustion gases more than sufficient to compensate for the quantity of said hotter combustion gases so added being removed from said common zone and cooled, a portion of the resulting cooled gases regulated to compensate for the quantity of hotter combustion gases added being thereafter removed from the system and the remaining portion thereof being commingled with the circulating stream of combustion gases serving to control the temperature of the exothermic reaction, subsequent to its passage through said common zone.

3. In a process involving endothermic and exothermic reactions simultaneously conducted in separate reaction zones, about each of which a combustion gas convective medium is circulated to control the reaction temperature therein, the improvement which comprises establishing a separate cycle of convective medium to serve each of said reactions, commingling the convective media of the separate cycles in a zone common thereto, whereby to substantially equalize the temperatures of said media, thereafter further heating the convective medium in the cycle serving the endothermic reaction, prior to its passage about the endothermic reaction zone, by adding fresh increments of hotter combustion gases to the circulating stream of this convective medium subsequent to its passage through said common zone, and continuously removing from said common zone and from the system a quantity of said commingled convective media regulated to compensate for the quantity of said added hotter combustion gases.

4. A process which comprises effecting an endothermic catalytic reaction in a first reaction zone, simultaneously reactivating spent catalyst by exothermic reaction in a second reaction zone, maintaining a separate cycle of convective medium about each of said zones to control the reaction temperature therein, and bringing the convective media of the separate cycles in heat transfer relationship with each other in a zone apart from said reaction zones, whereby to heat the convective medium in the cycle serving said first zone and to cool the convective medium in the cycle serving said second zone, the process being further characterized in that, after said heat transfer, heat is added to the convective medium in the cycle serving said first zone and abstracted from the convective medium in the cycle serving said second zone.

5. The process as defined in claim 4 further characterized in that the convective media are commingled in said zone apart from the reaction zones.

LEV A. MEKLER.